(12) United States Patent
Ooshima et al.

(10) Patent No.: US 11,067,165 B2
(45) Date of Patent: Jul. 20, 2021

(54) VEHICLE CONTROL DEVICE AND VEHICLE CONTROL METHOD

(71) Applicant: ISUZU MOTORS LIMITED, Tokyo (JP)

(72) Inventors: Tatsuya Ooshima, Saitama (JP); Nobuyuki Nishimura, Yokohama (JP); Junpei Matsuda, Yokohama (JP)

(73) Assignee: ISUZU MOTORS LIMITED, Tokyo (JP)

( * ) Notice: Subject to any disclaimer, the term of this patent is extended or adjusted under 35 U.S.C. 154(b) by 72 days.

(21) Appl. No.: 16/612,711

(22) PCT Filed: May 9, 2018

(86) PCT No.: PCT/JP2018/017970
§ 371 (c)(1),
(2) Date: Nov. 11, 2019

(87) PCT Pub. No.: WO2018/207834
PCT Pub. Date: Nov. 15, 2018

(65) Prior Publication Data
US 2020/0141487 A1    May 7, 2020

(30) Foreign Application Priority Data

May 12, 2017   (JP) .............................. JP2017-095966

(51) Int. Cl.
*F16H 61/02*    (2006.01)
*F16H 61/00*    (2006.01)
*F16H 59/66*    (2006.01)

(52) U.S. Cl.
CPC ... *F16H 61/0213* (2013.01); *F16H 2059/663* (2013.01); *F16H 2061/0015* (2013.01); *F16H 2061/022* (2013.01); *F16H 2061/0227* (2013.01)

(58) Field of Classification Search
CPC ....... F16H 2061/0227; F16H 2061/022; F16H 2061/0015; F16H 61/0213; F16H 2059/663
See application file for complete search history.

(56) References Cited

U.S. PATENT DOCUMENTS 5,832,400 A   11/1998  Takahashi et al.
5,931,886 A    8/1999  Moroto et al.
(Continued)

FOREIGN PATENT DOCUMENTS

CN   102128252 A   7/2011
CN   102395817 A   3/2012
(Continued)

OTHER PUBLICATIONS

Office Action for related CN App. No. 201880030973.6 dated Jul. 20, 2020. English translation provided; 13 pages.
(Continued)

*Primary Examiner* — Erin D Bishop
(74) *Attorney, Agent, or Firm* — Procopio, Cory, Hargreaves & Savitch LLP (57) ABSTRACT

In this vehicle control device (10), which controls operation of a vehicle provided with a transmission including a direct gear and an overdrive gear, which is a gear with a lower gear ratio than that of the direct gear, a travel segment determination unit (15) determines a next travel segment which, forward in the travel direction of the vehicle, has a road slope different from that of the current travel segment where the vehicle is currently traveling. A next gear stage selection unit (16) determines a next gear stage, which will be the gear stage of a transmission in the next travel segment, on the basis of the speed of the vehicle, an equal fuel consumption map of the engine of the vehicle, and the travel resistance of the vehicle in the next travel segment estimated on the basis of the road slope in the next travel segment. The next gear (Continued)

stage selection unit (16) selects the next gear stage referring to different equal fuel consumption maps depending on whether the gear stage of the transmission is the direct gear or whether the gear stage of the transmission is a normal gear.

6 Claims, 5 Drawing Sheets

(56) References Cited

U.S. PATENT DOCUMENTS

| | | | | |
|---|---|---|---|---|
| 6,244,986 | B1 * | 6/2001 | Mori | F16H 61/6648 477/46 |
| 7,470,212 | B2 * | 12/2008 | Inagaki | F16H 61/061 477/107 |
| 9,989,147 | B2 * | 6/2018 | Sujan | F16H 59/66 |
| 2012/0029776 | A1 | 2/2012 | Staudinger et al. | |
| 2012/0123651 | A1 | 5/2012 | Johansson et al. | |
| 2013/0345942 | A1 | 12/2013 | Staudinger et al. | |
| 2015/0330502 | A1 | 11/2015 | Johansson et al. | |
| 2016/0084374 | A1 | 3/2016 | Kim | |

FOREIGN PATENT DOCUMENTS

| | | |
|---|---|---|
| CN | 102458953 A | 5/2012 |
| CN | 104620025 A | 5/2015 |
| CN | 105422839 A | 3/2016 |
| JP | H08072591 A | 3/1996 |
| JP | H09021457 A | 1/1997 |
| JP | 2000213640 A | 8/2000 |
| JP | 2013032156 A | 2/2013 |
| JP | 2014001824 A | 1/2014 |

OTHER PUBLICATIONS

International Search Report and Written Opinion for related PCT App No. PCT/JP2018/017970 dated Aug. 7, 2018, 7 pgs.

* cited by examiner

VEHICLE CONTROL DEVICE AND VEHICLE CONTROL METHOD

CROSS-REFERENCE TO RELATED APPLICATIONS

This application is a U.S. National Stage entry of PCT Application No: PCT/JP2018/017970 filed on May 9, 2018, which claims priority to Japanese Patent Application No. 2017-095966, filed May 12, 2017, the contents of which are incorporated herein by reference.

TECHNICAL FIELD

The present disclosure relates to a vehicle control device and a vehicle control method, and more specifically to a technique for selecting a gear stage of a transmission mounted on a vehicle.

BACKGROUND ART

There has been proposed a technique for setting a shift schedule to minimize fuel consumption amount on a travel route by estimating drive force of a vehicle on a travel route in accordance with road information on a travel route from a current position of the vehicle to a target position and by comparing the estimated drive force with a fuel consumption map stored in advance (see PTL 1).

CITATION LIST

Patent Literature

PTL 1: JP-A-9-21457

SUMMARY OF INVENTION

Technical Problem

Large vehicles such as trucks and buses may be provided with a transmission called Automated Manual Transmission (hereinafter, referred to as "AMT"). The AMT is a transmission which automatically shifts a gear stage of a transmission by moving a sleeve in a manual transmission according to the related art by means of an actuator.

The final drive force of the vehicle depends on a gear selected by the AMT. Here, the AMT is provided with a large number of gears, and resistance of squeezing at gear stages may be different from each other. The difference in resistance of the squeezing at the gear stages affects the fuel consumption amount of engines mounted on vehicles. Therefore, there is room for improvement in a technique for selecting a shift gear based on the vehicle fuel consumption amount.

The present disclosure has been made in view of these situations, and an object of the present disclosure is to provide a vehicle control device which can improve the technique for selecting a gear stage in a vehicle including an automated manual transmission.

Solution to Problem

According to a first illustrative aspect of the present disclosure, there may be provided a vehicle control device configured to control operation of a vehicle comprising a transmission, the transmission comprising: an input shaft configured to receive power of an engine; a direct gear configured to directly couple the input shaft to an output shaft without using a counter shaft; and a normal gear configured to transmit the power of the engine to the output shaft via the counter shaft, the normal gear comprising an overdrive gear having a gear ratio lower than that of the direct gear, the vehicle control device comprising: a travel segment determination unit configured to determine a next travel segment ahead of the vehicle in a travel direction, the next travel segment being a travel segment with a road slope different from that of a current travel segment where the vehicle is currently traveling; and a next gear stage selection unit configured to select a next gear stage, which is a gear stage of the transmission in the next travel segment, based on: a travel resistance of the vehicle in the next travel segment estimated based on a road slope of the next travel segment; a speed of the vehicle; and a fuel consumption contour map of the engine provided in the vehicle, wherein the next gear stage selection unit is configured to select the next gear stage referring to different fuel consumption contour maps in a case where the gear stage of the transmission is the direct gear and in a case where the gear stage of the transmission is the normal gear.

The vehicle control device may further comprise: a shift control unit configured to, in response to the vehicle reaching the next travel segment in a case the gear stage of the transmission in the current travel segment is the overdrive gear and the next gear stage is the direct gear and on a condition that an estimated travel time of the vehicle in the next travel segment is longer than predetermined time, control the gear stage of the transmission to downshift to the direct gear.

The shift control unit may be configured to, in response to the vehicle reaching the next travel segment in a case the gear stage of the transmission in the current travel segment is the overdrive gear and the next gear stage is the direct gear and on a condition that the road slope of the next travel segment is an upslope equal to or greater than a predetermined value, control the gear stage of the transmission to downshift to the direct gear.

According to a second illustrative aspect of the present disclosure, there may be provided a vehicle control method for a vehicle comprising a control unit and a transmission, the transmission comprising an input shaft configured to receive power of an engine, a direct gear configured to directly couple the input shaft to an output shaft without using a counter shaft, and a normal gear configured to transmit the power of the engine to the output shaft via the counter shaft, the normal gear comprising an overdrive gear having a gear ratio lower than that of the direct gear, the vehicle control method comprising controlling the control unit to perform: a step of determining a next travel segment ahead of the vehicle in a travel direction, the next travel segment being a travel segment with a road slope different from that of a current travel segment where the vehicle is currently traveling; and a step of selecting a next gear stage, which is the gear stage of the transmission in the next travel segment, based on: a travel resistance of the vehicle in the next travel segment estimated based on a road slope of the next travel segment; a speed of the vehicle; and a fuel consumption contour map of the engine provided in the vehicle, wherein in the step of selecting the next gear stage, the next gear stage is selected referring to different fuel consumption contour maps in a case where the gear stage of the transmission is the direct gear and in a case where the gear stage of the transmission is the normal gear.

Advantageous Effects of Invention

According to the present disclosure, it is possible to improve a technique for selecting a shift gear in a vehicle provided with an automated manual transmission.

DESCRIPTION OF ILLUSTRATIVE EMBODIMENTS

Outline of Illustrative Embodiment

Figure 1:
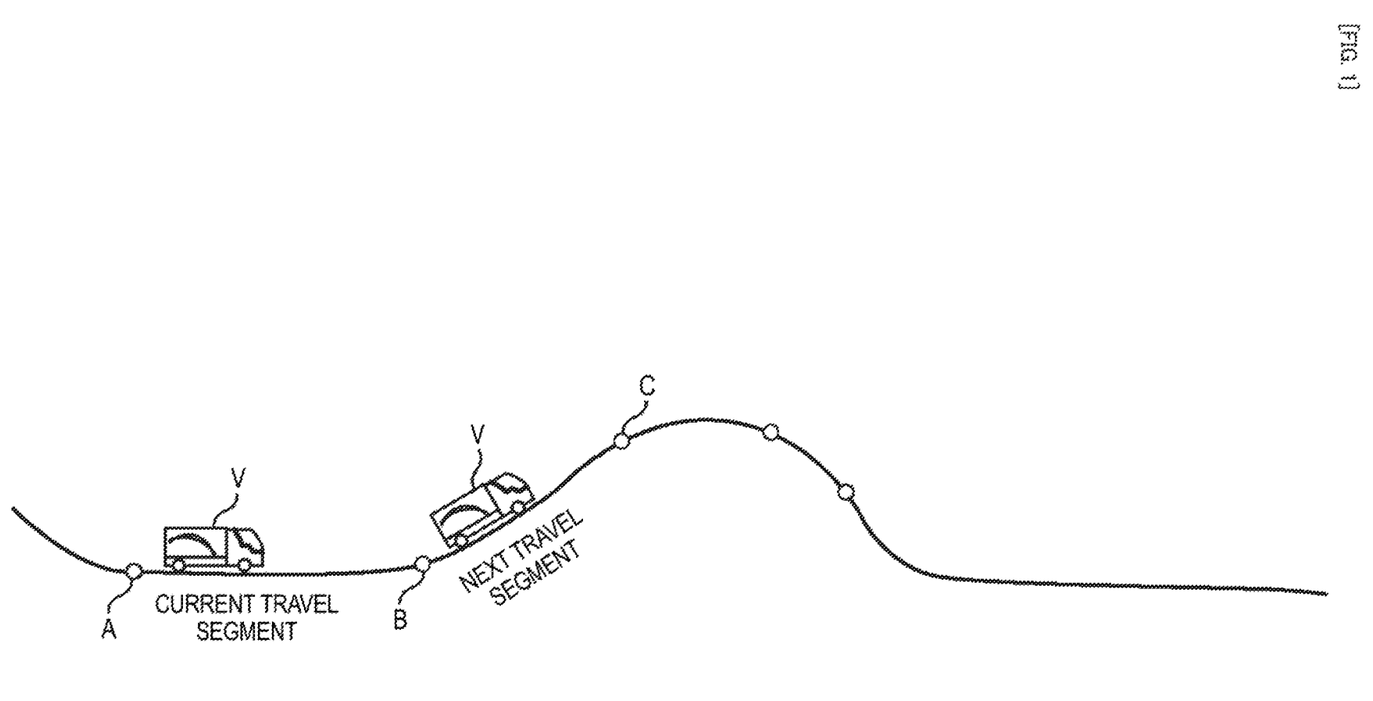
FIG. 1 is a diagram showing an outline of a vehicle according to an illustrative embodiment.

FIG. 1 is a diagram showing an outline of a vehicle V according to an illustrative embodiment. The outline of the vehicle V according to the illustrative embodiment will be described with reference to FIG. 1. The vehicle V according to the illustrative embodiment is a large vehicle provided with an AMT, and is driven by an engine such as a diesel engine.

In recent years, a computing device such as an electronic control unit (ECU) mounted on a vehicle has been widely used to automatically select a gear stage of a transmission such that a vehicle overcomes travel resistance to travel and fuel consumption of the vehicle is improved. Although details will be described below, the selection of the gear stage in the vehicle is performed by selecting a gear stage which improves the fuel consumption of the vehicle from gear stages capable of generating torque which overcomes the travel resistance of the vehicle, with reference to a fuel consumption contour map of the engine.

During travelling of the vehicle, an acceleration of the vehicle is proportional to an amount obtained by subtracting travel resistance of the vehicle from drive force of the vehicle, and is inversely proportional to weight of the vehicle. Accordingly, the ECU mounted on the vehicle estimates the travel resistance of the vehicle from the drive force of the vehicle, the weight of the vehicle and the acceleration of the vehicle, and selects a gear stage capable of generating a torque which overcomes the travel resistance. However, in a case where the ECU estimates the travel resistance using the acceleration of the vehicle, the ECU is able to estimate the travel resistance of the vehicle at a currently traveling position, but is unable to estimate the travel resistance at a position ahead of the currently traveling position.

In a case where the ECU determines the travel resistance by estimation, calculation accuracy of the travel resistance is not necessarily high. Thus, if a gear stage is selected based on the travel resistance whose accuracy is not necessarily ensured, it is not necessarily ensured that the selected gear stage is a gear stage that can improve the fuel consumption of the vehicle. Therefore, the ECU of the vehicle V according to the illustrative embodiment estimates the travel resistance at the next position by obtaining slope information of a road at the position ahead of the currently traveling position. A summary of a method for estimating the travel resistance at the next position by obtaining slope information by means of the vehicle V according to the illustrative embodiment will be described below.

The vehicle V according to the illustrative embodiment has a satellite navigation function of obtaining position information showing a current position of the vehicle V based on information received from a navigation satellite. In addition, the vehicle V stores slope information of a road on which the vehicle V travels. Incidentally, the vehicle V may have an autonomous navigation function of obtaining a current position of the vehicle V based on an output value of an acceleration sensor or the like, without using the information received from the navigation satellite.

On the basis of the slope information of the road and the position information of the vehicle V, the ECU of the vehicle V prefetches slope information of a road on which the vehicle V will travel in the near future. In FIG. 1, the vehicle V is traveling in a "current travel segment" having a point A as a start point and a point B as an end point. In the example shown in FIG. 1, a road on which the vehicle V is traveling is an upslope above a certain level in a "next travel segment" having the point B as a start point and a point C as an end point. Incidentally, the "next travel segment" is a travel segment whose average slope of the road is different from that of the current travel segment on which the vehicle V is currently traveling, and is a travel segment ahead of the vehicle V in a travel direction.

The slope information of the next travel segment prefetched by the ECU is determined from the slope information stored by the vehicle V and the position information of the vehicle V. The travel resistance of the vehicle V is dominated by slope resistance, air resistance, and rolling resistance. From among these resistance, the slope resistance can be estimated. As a result, the ECU can estimate the travel resistance of the next travel segment.

Here, the fuel consumption of the vehicle V is not only affected by specific fuel consumption (that is, the amount of fuels consumed by an engine to generate predetermined drive force) of an engine provided in the vehicle V, but also affected by sliding resistance inside the engine or a loss in a power transmission path of the engine. Here, the loss in the power transmission path of the engine is, for example, a loss caused by transmission efficiency of each gear provided in the transmission.

Therefore, the vehicle V according to the illustrative embodiment refers to a fuel consumption contour map in consideration of the transmission efficiency of each gear provided in the transmission when a gear in the next travel segment is to be selected. As a result, the vehicle V according to the illustrative embodiment can more accurately select a gear stage having a high fuel consumption in the next travel segment.

In a case where the vehicle V is traveling on an automobile-only road such as a highway, the vehicle V changes presence or absence of a shift to the gear stage selected by the prefetch according to various traveling environments where the vehicle V is placed. As a result, an uncomfortable feeling, which can be given to a driver due to the shift of the vehicle V, can be reduced.

Configuration of Vehicle V According to Illustrative Embodiment

An internal configuration of the vehicle V according to the illustrative embodiment will be described with reference to FIG. 2.

Figure 2:
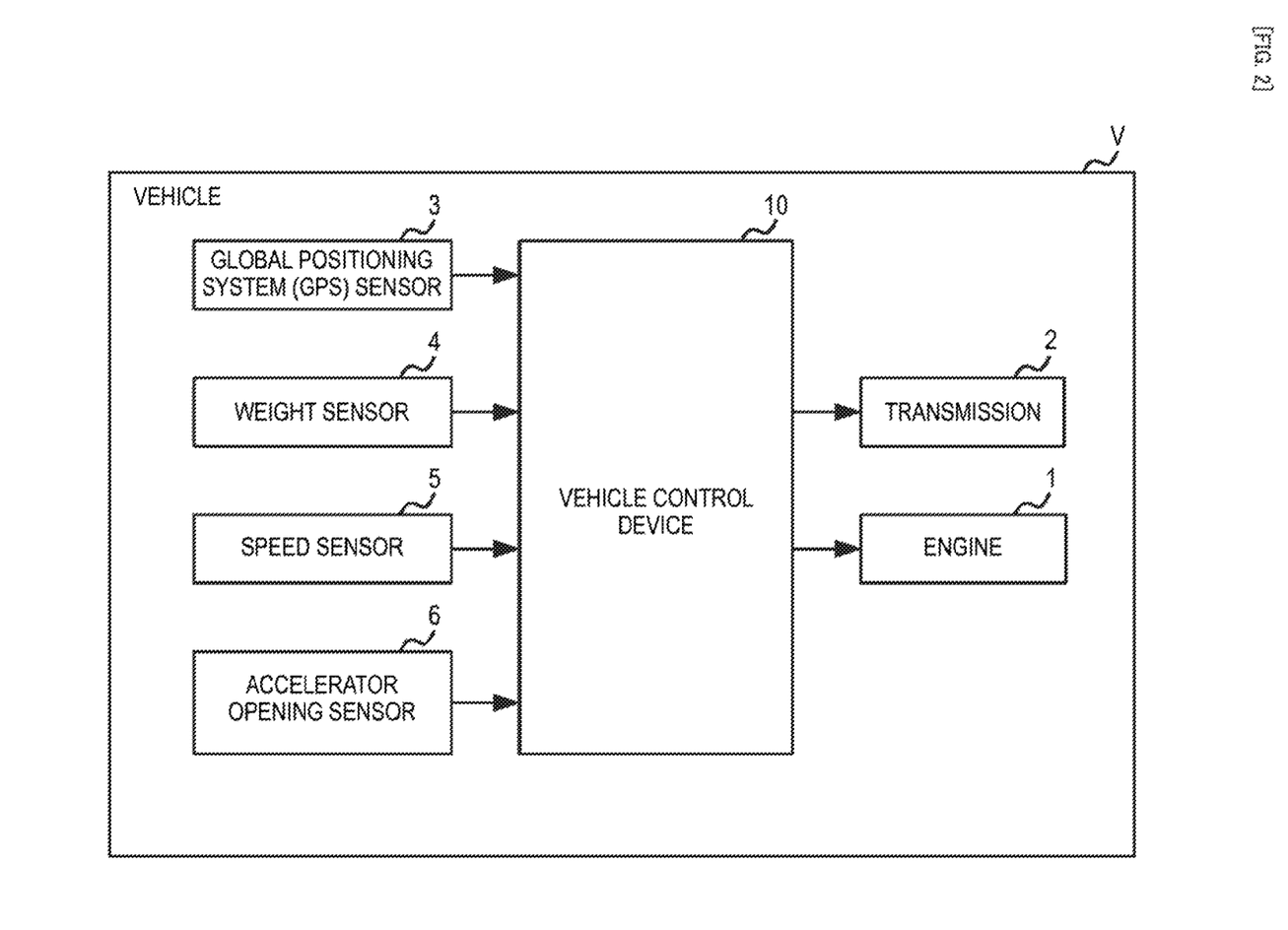
FIG. 2 is a diagram schematically showing an internal configuration of the vehicle according to the illustrative embodiment.

FIG. 2 is a diagram schematically showing an internal configuration of the vehicle V according to the illustrative embodiment. The vehicle V according to the illustrative embodiment includes an engine 1, a transmission 2, a global positioning system (OPS) sensor 3, a weight sensor 4, a speed sensor 5, an accelerator opening sensor 6, and a vehicle control device 10 as the ECU.

The vehicle V is a large vehicle that uses the engine 1, such as a diesel engine, to provide drive force, and is, in particular, a vehicle having an automatic cruise mode. The transmission 2 is an AMT for transmitting rotational drive force of the engine 1 to a drive wheel (not shown) of the vehicle V. The transmission 2 includes a plurality of stages of gears for converting the rotational drive force of the engine 1.

Here, the "automatic cruise mode" in the vehicle V refers to a mode in which the engine 1, the transmission 2, and the like are automatically controlled by the ECU so as to maintain a speed of the vehicle V set in advance even if the driver does not operate the accelerator or a shift lever. It is mainly assumed that the automatic cruise mode is used when the vehicle V travels on a highway.

The GPS sensor 3 receives and analyzes radio waves transmitted from a plurality of navigation satellites, so as to obtain a position of the GPS sensor 3, that is, a position of the vehicle V on which the GPS sensor 3 is mounted. The GPS sensor 3 outputs information indicating the position of the vehicle V to the vehicle control device 10.

The weight sensor 4 obtains total weight of the vehicle V. Specifically, the weight sensor 4 obtains the total weight of the vehicle V by measuring weight of a load of the vehicle V and adding up the weight of the load and weight of the vehicle V alone excluding the load. The weight sensor 4 outputs information indicating the total weight of the vehicle V to the vehicle control device 10.

The speed sensor 5 measures the speed of the vehicle V. The speed sensor 5 outputs information indicating the measured speed to the vehicle control device 10. The accelerator opening sensor 6 measures an accelerator opening degree that is a press-down amount of a pedal of an accelerator by a driver of the vehicle V. The accelerator opening sensor 6 outputs information indicating the accelerator opening degree to the vehicle control device 10.

The vehicle control device 10 obtains information from each of the sensors described above, and controls, based on the obtained information, the amount of fuels to be supplied to a cylinder in the engine 1 and the gear stages of the transmission 2. In a case where the vehicle V is in the automatic cruise mode, the vehicle control device 10 controls the engine 1 and the transmission 2 such that the vehicle V travels at a set speed. In addition, in a case where a speed limit device (SLD) of the vehicle V (not shown) is operating, the vehicle control device 10 controls the engine 1 and the transmission 2 such that the speed of the vehicle V does not exceed the set upper limit speed.

Figure 3:
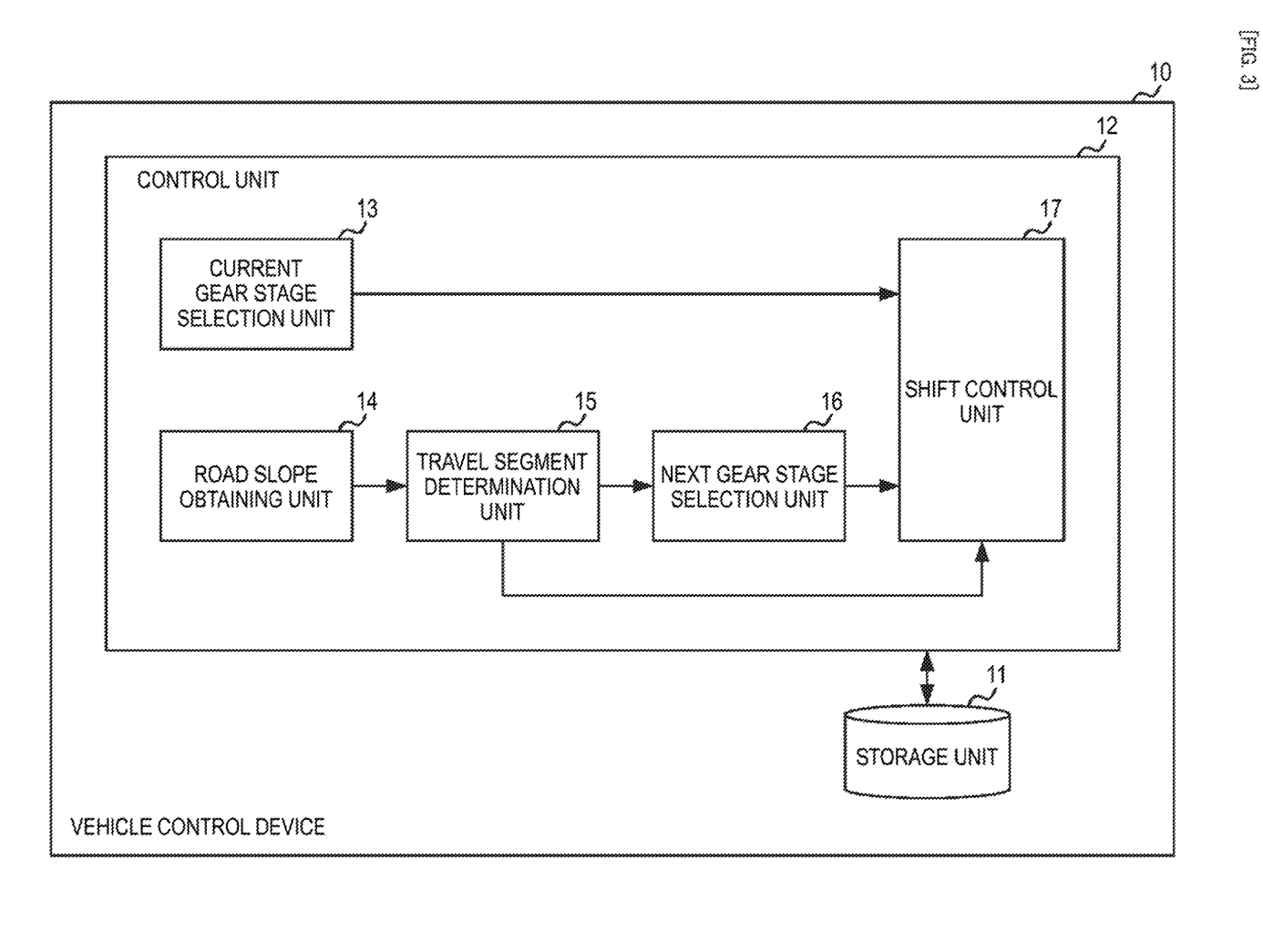
FIG. 3 is a diagram schematically showing a functional configuration of a vehicle control device according to the illustrative embodiment.

FIG. 3 is a diagram schematically showing a functional configuration of the vehicle control device 10 according to the illustrative embodiment. The vehicle control device 10 according to the illustrative embodiment includes a storage unit 11 and a control unit 12.

The storage unit 11 is, for example, a read only memory (ROM) or a random access memory (RAM). The storage unit 11 stores various programs for causing the control unit 12 to perform operations. The storage unit 11 may store map information, and may store information indicating a road slope of a road.

The control unit 12 is a computational resource such as a central processing unit (CPU; not shown). The control unit 12 functions as a current gear stage selection unit 13, a road slope obtaining unit 14, a travel segment determination unit 15, a next gear stage selection unit 16, and a shift control unit 17 by executing a program stored in the storage unit 11.

The current gear stage selection unit 13 selects a current gear stage, which is a gear stage of the transmission 2 in the segment where the vehicle V is traveling, based on an estimated value of the travel resistance of the vehicle V on the road on which the vehicle V is currently traveling. Details of the current gear stage selection by the current gear stage selection unit 13 will be described below.

The road slope obtaining unit 14 obtains a road slope on the road on which the vehicle V is currently traveling, based on the information indicating the position of the vehicle V obtained from the GPS sensor 3 and the map information stored in the storage unit 11.

On the basis of the road slope obtained by the road slope obtaining unit 14, the travel segment determination unit 15 determines a next travel segment ahead of the vehicle V in the travel direction, which is a travel segment with an average road slope different from that of the current travel segment where the vehicle V is currently travelling, by a predetermined value or more.

The next gear stage selection unit 16 selects a gear stage, which is a gear stage of the transmission 2 in the next travel segment, based on the road slope of the next travel segment and the speed of the vehicle V. Hereinafter, details of the next gear stage selection by the next gear stage selection unit 16 will be described together with the current gear stage selection by the current gear stage selection unit 13.

Incidentally, in order to obtain the slope information of the road on which the vehicle V will travel in the future, it is necessary for the road slope obtaining unit 14 to estimate a place where the vehicle V will travel in the future. When the road slope obtaining unit 14 cannot obtain the road slope, the next travel segment by the travel segment determination unit 15 is hardly determined.

In a case where the vehicle V travels on an automobile-only road such as a highway, the road slope obtaining unit 14 is relatively easy to estimate the place where the vehicle V will travel in the future. On the other hand, in a case where the vehicle V travels on a road including many branches such as a general road and an urban area, the road slope obtaining unit 14 hardly estimates the place where the vehicle V will travel in the future.

As described above, while the vehicle V is currently traveling on a general road, an urban area, or the like, the vehicle V travels in accordance with the gear selection via the current gear stage selection unit 13. In a case where the vehicle V travels on an automobile-only road such as a highway, the shift control unit 17 obtains a gear selection result by the current gear stage selection unit 13 and a gear selection result by the next gear stage selection unit 16. The shift control unit 17 controls a shift of the gear stage of the transmission 2 based on the gear selection result by the current gear stage selection unit 13 and the gear selection result by the next gear stage selection unit 16.

Hereinafter, the transmission 2 will be described first, and then a relationship between a gear stage and fuel consumption will be described. Thereafter, the shift control by the shift control unit 17 will be described.

Transmission 2 According to Illustrative Embodiment

The transmission 2 provided in the vehicle V according to the illustrative embodiment is an AMT, and is a transmission which achieves automatic transmission of a gear stage of the transmission 2 by moving a sleeve in a known manual transmission by an actuator. Therefore, a basic structure of the transmission 2 according to the illustrative embodiment is similar to that of a known manual transmission. The transmission 2 according to the illustrative embodiment includes two sub transmission mechanisms called a splitter and a range, and one main transmission mechanism provided between the splitter and the range.

The splitter changes a gear ratio between an input shaft, which receives power of the engine of the vehicle V, and a counter shaft. The main transmission mechanism mainly changes a gear ratio between a counter shaft and an output shaft. The range is provided on a driving transmission path for transmitting the rotational driving of an output shaft to a propeller shaft, and changes a gear ratio between the output shaft and the propeller shaft. The main transmission mechanism includes a "direct gear" directly coupling the input shaft to the output shaft.

In the transmission 2 of the vehicle V according to the illustrative embodiment, gear stages of the splitter, the main transmission mechanism, and the range are, for example, two stages, three stages, and two stages, respectively. That is, the transmission 2 provided in the vehicle V according to the illustrative embodiment is a 12-stage (2 stages×3 stages×2 stages=12 stages) transmission. If a 12-stage gear (overdrive gear) or 11-stage gear (direct gear) is selected as a gear of the transmission 2 when the vehicle V travels around a highway with a small slope, it contributes to an improvement of the fuel consumption of the vehicle V.

The direct gear is a gear which directly couples the input shaft to the output shaft. Since the power of the engine is directly transmitted to the output shaft without using the counter shaft, the transmission efficiency is higher than those of other gear stages via the counter shaft. Even when the gear stage of the transmission 2 is five stages, the main transmission mechanism becomes a direct gear. However, a gear ratio of the range in this case does not become direct coupling (gear ratio: 1), and the transmission efficiency is decreased. Hereinafter, in the present specification, the gear stage of the transmission 2 is defined such that the "overdrive gear" means a gear at the highest stage of the transmission 2, and the "direct gear" means a gear at a stage lower than the highest stage of the transmission 2 by one stage.

[Relationship Between Gear Stage and Fuel Consumption]

Figure 4:
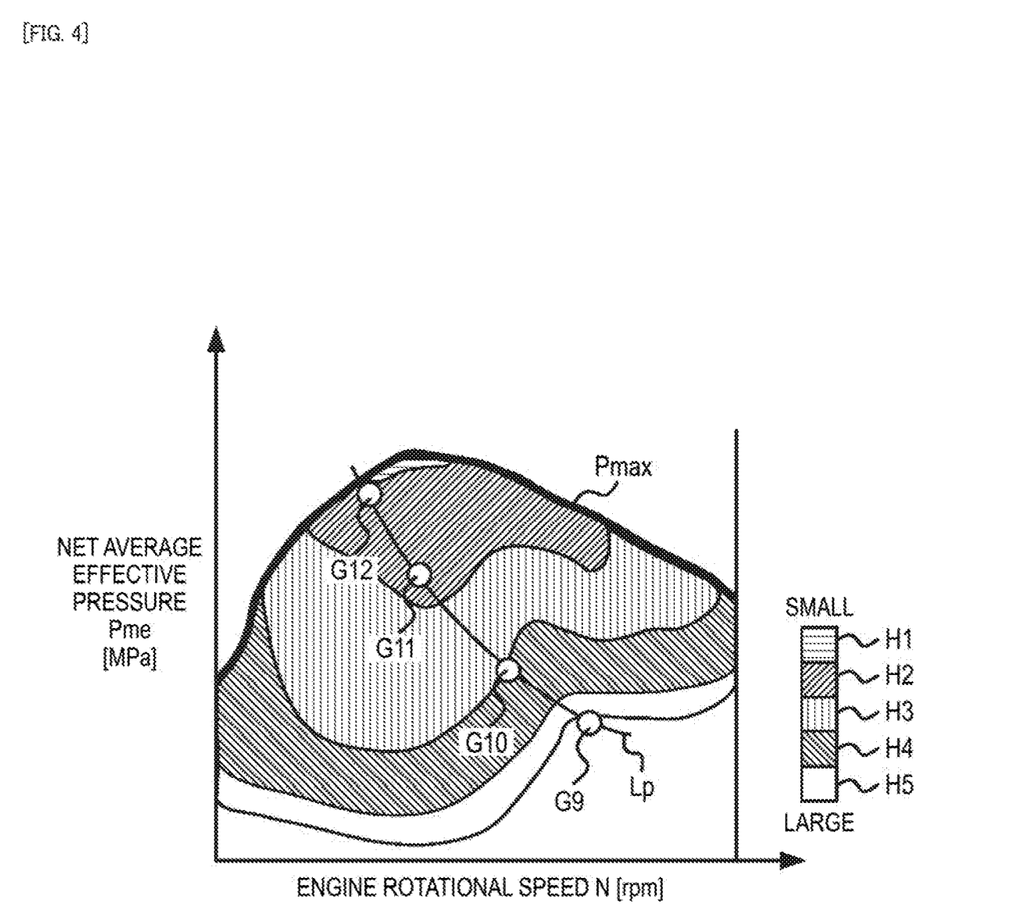
FIG. 4 is a graph schematically showing an example of a fuel consumption contour map of an engine according to the illustrative embodiment.

FIG. 4 is a diagram schematically showing an example of a fuel consumption contour map of the engine 1 according to the illustrative embodiment. Hereinafter, the gear selection in the transmission 2 will be described with reference to FIG. 4.

In the fuel consumption contour map shown in FIG. 4, a vertical axis indicates net average effective pressure (Pme) of a cylinder provided in the engine 1, and a horizontal axis indicates a rotational speed N of the engine 1. Torque T of the engine 1 is obtained by multiplying the net average effective pressure (Pme) by a predetermined value determined by the exhaust amount of the engine 1. That is, the net average effective pressure (Pme) is proportional to the torque T generated by the engine 1. When a proportionality coefficient is $\alpha$, $T = \alpha$ Pme.

In the fuel consumption contour map shown in FIG. 4, a curve indicated by a symbol "Pmax" is the maximum combustion pressure curve "Pmax" which indicates the maximum combustion pressure of the engine 1. The engine 1 cannot generate torque exceeding the maximum combustion pressure curve "Pmax" in the fuel consumption contour map shown in FIG. 4.

In the fuel consumption contour map shown in FIG. 4, an area indicated by hatching shows specific fuel consumption (SFC) of the engine 1. SFC indicates the fuel consumption amount per unit work of the engine 1. The smaller the SFC value is, the less fuel with which the engine 1 is able to do the same work.

In the fuel consumption contour map shown in FIG. 4, areas having different specific fuel consumption are identified using hatching. In FIG. 4, an area denoted by hatching H1 indicated by the symbol H1 is an area with the best specific fuel consumption (that is, the fuel consumption amount is small), and thereafter, the specific fuel consumption deteriorates in an order of hatching H2, hatching H3, hatching H4, and hatching H5. Incidentally, in FIG. 4, an illustration of an area where the specific fuel consumption is worse than the area denoted by the hatching H5 is omitted. Hereinafter, the area denoted by the hatching H1 is simply written as an area H1. The same applies to other areas.

In order for the vehicle V to overcome the travel resistance and travel at a constant speed Vc, force F, which is generated by the torque T generated by the vehicle V, is required to countervail the travel resistance of the vehicle V. In this case, the engine 1 of the vehicle V is required to output travel resistance horsepower Pv=F·Vc. In the fuel consumption contour map shown in FIG. 4, a curve indicated by a symbol Lp is a constant horsepower curve Lp corresponding to the travel resistance horsepower Pv=F·Vc.

When the engine 1 rotating at the rotational speed N generates torque T, the horsepower P output by the engine 1 is P=T N=$\alpha$ Pme N. Therefore, the net average effective pressure (Pme) is inversely proportional to the rotation speed N of the engine 1. Here, the rotation speed N of the engine 1 is determined by a gear ratio of the gear stages selected by the transmission 2. Therefore, the engine 1 is unable to reach any rotation speed on the constant horsepower curve Lp in an fuel consumption contour map, and is regulated to a discrete rotation speed determined by the speed Vc and the gear ratio of the transmission 2.

In FIG. 4, a white circle G12 indicated by a symbol G12 shows a state of the engine 1 in a case where the gear stage of the transmission 2 is 12 stages (that is, an overdrive gear). Similarly, white circles indicated by the symbols G11, G10, and G9 show states of the engine 1 in the cases of 11 stages (that is, a direct gear), 10 stages, and 9 stages, respectively. In a case where the gear stages of the transmission 2 are 12 stages and 11 stages, although both are contained in the area H2, the case of 12 stages is closer to the area H1 and the fuel consumption is better.

As described above, when the speed Vc of the vehicle V and the travel resistance horsepower Pv of the vehicle V are determined, the current gear stage selection unit 13 and the next gear stage selection unit 16 can determine a gear stage with good fuel consumption with reference to the fuel consumption contour map.

[Gear Stage Selection by Current Gear Stage Selection Unit 13]

The current gear stage selection unit 13 estimates an estimated value Pv of the travel resistance of the vehicle V on the road on which the vehicle V is currently traveling, and refers to the fuel consumption contour map using the speed of the vehicle V and the estimated value Pv of the travel resistance, so as to select the gear stage of the transmission 2.

As described above, the acceleration of the vehicle V during travelling of the vehicle V is proportional to an amount obtained by subtracting the travel resistance of the vehicle from the drive force of the vehicle V, and is inversely proportional to the weight of the vehicle V. The current gear stage selection unit 13 estimates the net average effective pressure Pme, which is generated by the engine 1, from the injection amount of fuels injected to the engine 1. The current gear stage selection unit 13 obtains the torque T, which is generated by the engine 1, from the net average effective pressure Pme. The current gear stage selection unit 13 obtains the drive force of the vehicle V from the torque T, the gear ratio of the gear stages selected by the transmission 2, the final reduction ratio, and a diameter of the drive wheel. The current gear stage selection unit 13 selects the gear stage by estimating the travel resistance of the vehicle V from the drive force of the vehicle V, the weight of the vehicle V, and the acceleration of the vehicle V, and by referring to the fuel consumption contour map.

[Gear Stage Selection by Next Gear Stage Selection Unit 16]

The next gear stage selection unit 16 differs from the current gear stage selection unit 13 in that the travel resistance of the vehicle V is calculated by calculation. Here, the travel resistance of the vehicle V is dominated by the sum of rolling resistance of the drive wheel of the vehicle V, the air resistance of the vehicle V, and the slope resistance of the road on which the vehicle V travels. The air resistance of the vehicle V is proportional to the square of the speed of the vehicle V. The slope resistance of the road depends on the slope of the road on which the vehicle travels and the weight of the vehicle V. The rolling resistance of the drive wheel and the proportional coefficient for calculating the air resistance of the vehicle V are stored in the storage unit 11 by a manufacturer of the vehicle V in advance.

The next gear stage selection unit 16 refers to the map information stored in the storage unit 11, and obtains the slope information of the next travel segment determined by the travel segment determination unit 15. Further, the next gear stage selection unit 16 obtains the weight of the vehicle V and the speed of the vehicle V from the weight sensor 4 and the speed sensor 5, respectively. As a result, the next gear stage selection unit 16 calculates the slope resistance of the vehicle V in the next travel segment.

The next gear stage selection unit 16 obtains the air resistance of the vehicle V by multiplying the square of the speed of the vehicle V by a proportional coefficient. The next gear stage selection unit 16 calculates the travel resistance of the vehicle V by adding up the slope resistance of the vehicle V, the air resistance of the vehicle V, and the rolling resistance read from the storage unit 11. Similar to the current gear stage selection unit 13, the next gear stage selection unit 16 selects the gear stage in the next travel segment from the calculated travel resistance and the fuel consumption contour map.

Here, the next gear stage selection unit 16 selects the next gear stage with reference to different fuel consumption contour maps in a case where the gear stage of the transmission 2 is a direct gear and in a case where the gear stage of the transmission 2 is a normal gear.

Figure 5A:
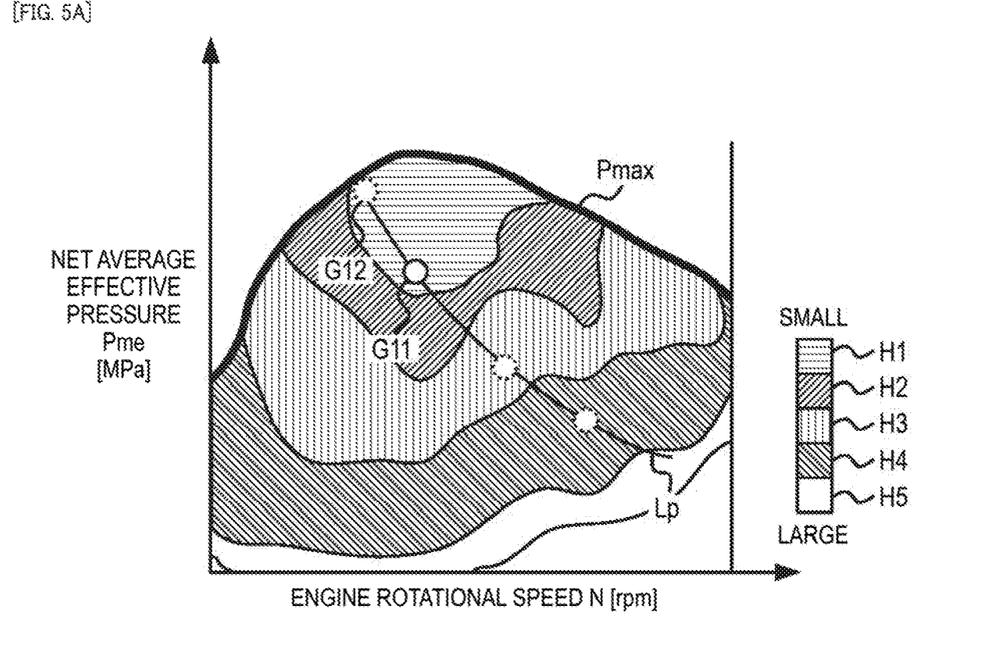
FIG. 5A is a graph schematically showing an example of a fuel consumption contour map of a direct gear.
Figure 5B:
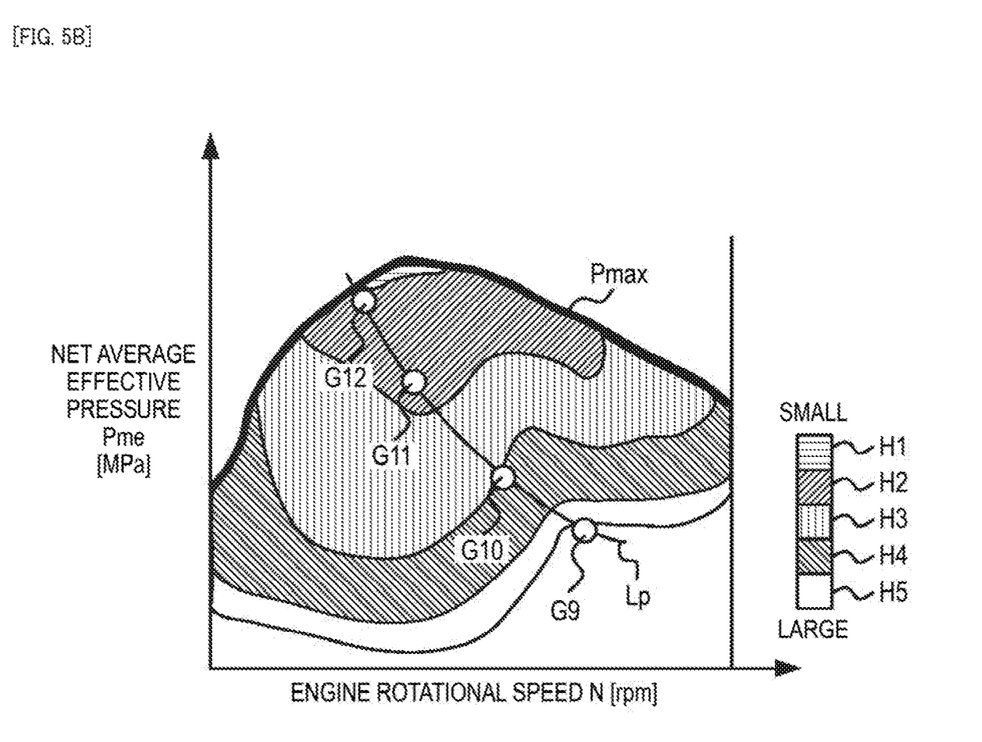
FIG. 5B is a graph schematically showing an example of a fuel consumption contour map of a normal gear.

FIGS. 5A and 5B are graphs showing a difference between a fuel consumption contour map of a normal gear and a fuel consumption contour map of a direct gear. Specifically, FIG. 5A is a graph schematically showing an example of a fuel consumption contour map of a direct gear, and FIG. 5B is a graph schematically showing an example of a fuel consumption contour map of a normal gear. The fuel consumption contour map shown in FIG. 5B is the same as the fuel consumption map shown in FIG. 4. In other words, the white circle G12 in the fuel consumption contour map of the normal gear shown in FIG. 5B shows a state of the engine 1 in the case of an overdrive gear in which the gear stage of the transmission 2 is 12 stages.

As described above, the transmission efficiency of the gear of the entire transmission 2 is increased in the case where the gear stage of the transmission 2 is a direct gear, as compared with the case where the gear stage of the transmission 2 is a normal gear. Therefore, a transmission loss, which occurs before the output of engine 1 is transmitted to the drive wheel of vehicle V, is reduced in the case where the gear stage of the transmission 2 is a direct gear, as compared with the case where the gear stage of the transmission 2 is a normal gear. As a result, the specific fuel consumption of the engine 1 is improved in the case where the gear stage of the transmission 2 is a direct gear, as compared with the case where the gear stage of the transmission 2 is a normal gear.

When the fuel consumption contour map of the direct gear shown in FIG. 5A is compared with the fuel consumption contour map of the normal gear shown in FIG. 5B, the area H1 in an area below the maximum combustion pressure curve Pmax in the fuel consumption contour map of the direct gear is wider. Therefore, a part which is the area H2 in the fuel consumption contour map of the normal gear also becomes the area H1 in the fuel consumption contour map of the direct gear.

A constant horsepower curve Lp shown in FIG. 5A is the same as a constant horsepower curve Lp shown in FIG. 5B. As shown in FIG. 5A, the state of the engine 1 in the direct gear (11 stages) in the constant horsepower curve Lp is contained in the area H1. This means that, in order to make the engine 1 to perform operation corresponding to the constant horsepower curve Lp, the fuel consumption of the vehicle V is improved in a case where the transmission 2 adopts a direct gear as compared with a case where the transmission 2 adopts a normal gear such as an overdrive gear.

As described above, the next gear stage selection unit 16 selects a gear stage with reference to the fuel consumption contour map reflecting the difference in transmission efficiency of the gear stage of transmission 2, so that the gear stage which improves the fuel consumption of the vehicle V can be selected more accurately.

[Shift Transmission Control by Shift Control Unit 17]

When the vehicle V is currently traveling, the current gear stage selection unit 13 always selects an optimal gear stage of the transmission 2 in accordance with a change in the travel resistance of the vehicle V. In a case where the vehicle V is traveling on an automobile-only road such as a highway, the next gear stage selection unit 16 prefetches an optimal gear stage in the next travel segment determined by the travel segment determination unit 15 while the vehicle V is currently travelling in the current travel segment.

Therefore, when the vehicle V reaches a boundary between the current travel segment and the next travel segment in a case where the vehicle V is traveling on an automobile-only road such as a highway, a conflict between the current gear stage and the next gear stage may be occurred. Since the gear ratio of the direct gear is higher than the gear ratio of the overdrive gear, the engine rotational speed of the engine 1 in the case of the direct gear is higher even when the speed of the vehicle V is the same. Therefore, for example, when the transmission 2 is shifted from the overdrive gear to the direct gear from the viewpoint of improving the fuel consumption, the driver of vehicle V may get an impression that engine 1 has suddenly blown up.

Therefore, in accordance with various travel environments where the vehicle V is placed, the shift control unit 17 changes, whether to shift to the next gear stage when the vehicle V reaches the boundary between the current travel segment and the next travel segment. The shift transmission control of the transmission 2 by the shift control unit 17, which is performed in accordance with the various traveling environments in which the vehicle V is placed, will be described below.

(First Shift Transmission Control)

It is assumed that the gear stage of the transmission 2 in the current travel segment is the overdrive gear and that the next gear stage selected by the next gear stage selection unit 16 is a direct gear. The shift control unit 17 controls the gear stage of the transmission 2 to downshift from the overdrive gear to the direct gear when the vehicle V reaches the next travel segment, on a condition that estimated travel time of the vehicle V in the next travel segment is longer than predetermined time.

Here, the "predetermined time" is "downshifting determination reference threshold time", which is referred to in order to determine whether the shift control unit 17 controls the gear stage of the transmission 2 to downshift from the overdrive gear to the direct gear at the boundary between the current travel segment and the next travel segment. A specific value of the downshifting determination threshold time may be determined by an experiment in consideration of slope information of a road on which the vehicle V is assumed to travel, performances of the engine 1 provided in the vehicle V, and the like, and it is, for example, one minute. This is the time during which the vehicle V traveling at 80 km/h travels approximately 1.3 km.

The shift control unit 17 prevents the downshifting in a case where the travel segment where the vehicle V is traveling after downshifting from the overdrive gear to the direct gear is shorter than the predetermined time, that is, in a case where the estimated travel time of the vehicle V is short. As a result, the shift control unit 17 can prevent the driver of the vehicle V from feeling that the shift is repeated in a short time.

As described above, the next gear stage selection unit 16 calculates the travel resistance of the vehicle V based on the weight of the vehicle V, the speed of the vehicle V, the rolling resistance of the vehicle V, and the like, and selects the next gear stage. Here, the next gear stage selection unit 16 may select the direct gear as the best gear, depending on a magnitude of measurement errors of the weight of the vehicle V, the speed of the vehicle V, the rolling resistance of the vehicle V, even in a case where the engine 1 has a low load (for example, in a case where the vehicle V is currently traveling on a flat road).

When the next gear stage selection unit 16 selects the direct gear as the next gear stage according to miscalculation of the travel resistance in a case where the vehicle V travels on a road whose next travel segment is flat, an unnecessary downshifting is performed at the boundary of the travel segments. As the gear ratio of the direct gear is larger than the gear ratio of the overdrive gear, the rotational speed of the engine 1 is increased when the gear stage of the transmission 2 downshifts from the overdrive gear to the direct gear. Since the increase in the rotational speed of the engine 1 may cause a noise, the driving feels of the driver may be impaired.

Therefore, as a condition for controlling the gear stage of the transmission 2 to downshift from the overdrive gear to the direct gear when the vehicle V reaches the next travel segment, the shift control unit 17 may add the fact that road slope in the next travel segment is an upslope greater than or equal to a predetermined value.

Here, the "upslope equal to or greater than a predetermined value" is a "downshifting determination reference threshold slope", which is referred to in order to determine whether the shift control unit 17 controls the gear stage of the transmission 2 to downshift from the overdrive gear to the direct gear at the boundary between the current travel segment and the next travel segment. A specific value of the downshifting determination reference threshold slope may be determined by an experiment in consideration of slope information of a road on which the vehicle V is assumed to travel, performances of the engine 1 provided in the vehicle V, and the like, and is, for example, 1%. As a result, it is possible to prevent the driver of the vehicle V from feeling uncomfortable due to unnecessary downshifting of the transmission 2.

(Second Shift Transmission Control)

It is assumed that the gear stage of the transmission 2 in the current travel segment is a direct gear, and that the next gear stage selected by the next gear stage selection unit 16 is also a direct gear. In this case, it is considered that the current gear stage selection unit 13 newly selects upshifting to the overdrive gear while the vehicle V is currently traveling in the current travel segment. The shift control unit 17 selects whether to control the transmission 2 to upshift before the vehicle V reaches the next travel segment based on a situation until the vehicle V reaches the next travel segment.

More specifically, when the estimated time until the vehicle V reaches the next travel segment is within predetermined time, even in a case where the current gear stage selection unit 13 newly selects upshifting to the overdrive gear, the shift control unit 17 maintains the gear stage of the transmission 2 as the direct gear without upshifting.

Here, the "predetermined time" is "upshifting determination reference threshold time", which is referred to in order to determine whether the shift control unit 17 controls the gear stage of the transmission 2 to upshift from the direct gear to the overdrive gear in the current travel segment. A specific value of the upshifting determination reference threshold time may be determined by an experiment in consideration of slope information of a road on which the vehicle V is assumed to travel, performances of the engine 1 provided in the vehicle V, and the like, and is, for example, one minute, which is the same as the downshifting determination reference threshold time. The upshifting determination reference threshold time is stored in the storage unit 11.

The shift control unit 17 prevents the upshifting in a case where the travel segment where the vehicle V travels after downshifting from the overdrive gear to the direct gear is short, that is, in a case where the estimated travel time of the vehicle V is short. As a result, the shift control unit 17 can prevent the driver of the vehicle V from feeling that the shift is repeated in a short time.

The shift control unit 17 may determine whether to upshift based on a distance condition instead of or in addition to the time condition. Specifically, when the travel distance until the vehicle V reaches the next travel segment is within a predetermined distance, even in a case where the current gear stage selection unit 13 newly selects upshifting to the overdrive gear, the shift control unit 17 may maintain the gear stage of the transmission 2 as the direct gear.

Here, the "predetermined distance" is "upshifting determination reference threshold distance", which is referred to in order to determine whether the shift control unit 17 controls the gear stage of the transmission 2 to upshift from the direct gear to the overdrive gear in the current travel segment. A specific value of the upshifting determination reference threshold distance may be determined by an experiment in consideration of slope information of a road on which the vehicle V is assumed to travel, performances of the engine 1 provided in the vehicle V, and the like, and is, for example, 1.5 kilometers. This is the distance for which the vehicle V traveling at a speed of 90 kilometer/h travels in one minute. As a result, the shift control unit 17 can prevent the driver of the vehicle V from feeling that the shift is repeated in a short time. Incidentally, the upshifting determination reference threshold distance is stored in the storage unit 11.

(Third Shift Transmission Control)

The vehicle V according to the illustrative embodiment has an automatic cruise mode in which the engine 1, the transmission 2, and the like are automatically controlled so as to maintain a preset speed of the vehicle V even if the driver of the vehicle V does not operate the accelerator or the shift lever. The speed limit device of the vehicle V controls the engine 1 and the transmission 2 such that the vehicle V travels at the upper limit speed without exceeding the set upper limit speed. As described above, the vehicle V has a mode in which the vehicle V travels automatically at a predetermined set speed.

The next gear stage selection unit 16 according to the illustrative embodiment estimates the travel resistance of the vehicle V on the assumption that the vehicle V is traveling at the set speed. Further, the next gear stage selection unit 16 refers to a fuel consumption contour map based on the rotation speed N of the engine 1 which is calculated on the assumption that the vehicle V is traveling at the set speed. Here, the speed of the vehicle V is not always equal to the set speed. For example, the vehicle V may temporarily accelerate due to overtaking by the driver of the vehicle V, or the vehicle V may decelerate due to a sudden slope. Therefore, in a case where an assumption of the speed of vehicle V deviates from the actual speed of vehicle V when the next gear stage selection unit 16 selects the next gear, the next gear stage may deviate from an optimum gear stage in the next travel segment.

Therefore, the shift control unit 17 changes the gear stage of the transmission 2 to the gear stage selected by the next gear stage selection unit 16 when the vehicle V reaches the next travel segment, on a condition that a difference between the predetermined set speed and the speed of the vehicle V is within a predetermined range.

Here, the "predetermined range" is a "shift determination reference range", which is referred to in order to determine whether the shift control unit 17 changes the gear stage of the transmission 2 to the gear stage selected by the next gear stage selection unit 16 at the boundary between the current travel segment and the next travel segment. A specific value of the shift determination reference range may be determined by an experiment in consideration of slope information of a road on which the vehicle V is assumed to travel, performances of the engine 1 provided in the vehicle V, and the like, and is, for example, 5 kilometer/h. That is, the shift control unit 17 changes the gear stage to the gear stage selected by the next gear stage selection unit 16 on a condition that a value, which is obtained by subtracting a hourly speed of the vehicle V from a set hourly speed, falls within ±5. The shift determination reference range is stored in the storage unit 11.

The shift control unit 17 may adopt an automatic cruise speed set in the vehicle V as the set speed, or may adopt a speed-limiter speed (speed at which the speed limit device operates) preset in the vehicle V as the set speed. In either case, the speed of the vehicle V is expected as a speed to be adopted when the vehicle V is in the automatic travelling mode. The shift control unit 17 is able to increase the effectiveness of the next gear stage by performing the shift to the next gear stage on a condition that the difference between the set speed and the speed of the vehicle V is within a predetermined range.

(Fourth Shift Transmission Control)

As described above, the current gear stage selection unit 13 estimates the travel resistance of the vehicle V from the drive force of the vehicle V, the weight of the vehicle V, and the acceleration of the vehicle V, and selects the gear stage with reference to the fuel consumption contour map. The current gear stage selection unit 13 may select the current gear stage by estimating the travel resistance in real time while the vehicle V is currently traveling or by reading and referring to a shift pattern, in which a relationship between the speed of the vehicle V and the gear stage of the transmission 2 is patterned, from the storage unit 11. In the following description, the aspect that the current gear stage selection unit 13 selects the current gear stage, which is the gear stage of the transmission 2 in the current travel segment, in accordance with the shift pattern determined in advance and stored in the storage unit 11 will be described as a premise.

The shift pattern stored in the storage unit 11 is not based on a general-purpose fuel consumption contour map, and the fuel consumption contour map is not referred to.

Here, it is assumed that the gear stage of the transmission 2 in the current travel segment is an overdrive gear, and that the next gear stage is a direct gear. In a case where the vehicle V ends the traveling in the current travel segment and starts the travelling in the next travel segment, that is, in a case where the travel segment as a next travel segment where the shift control unit 17 selects the next gear becomes the "current travel segment", discords are likely to occur between a current gear selected by the current gear stage selection unit 13 and a next gear selected by the shift control unit 17 in advance. This is because the fuel consumption contour map is not considered in a general-purpose shift map.

Therefore, when a gear stage of the transmission 2 in the current travel segment is an overdrive gear and a next gear stage is a direct gear, the shift control unit 17 maintains the gear stage of the transmission 2 as the direct gear while the vehicle V is currently travelling in a next travel segment. The shift control unit 17 controls the gear stage of the transmission 2 to downshift to the direct gear when the vehicle V reaches the next travel segment, and maintains the gear stage of the transmission 2 as the direct gear even if the current gear stage selection unit 13 selects the overdrive gear while the vehicle V is currently travelling in the next travel segment (that is, a current travel segment) during next gear selection by the next gear stage selection unit 16. As a result, the gear stage of the transmission 2 is selected alternately between the current gear stage and the pre-selected next gear stage, and shift hunting can be prevented from occurring.

Incidentally, the shift control unit 17 is able to perform the above-described four shift transmission controls from the first shift transmission control to the fourth shift transmission control in any combination. The new shift transmission control generated by the combination also has an effect of original shift control.

<Effect of Vehicle Control Device 10>

As described above, according to the vehicle control device 10 of the illustrative embodiment, it is possible to improve estimation accuracy of the fuel consumption amount and the technique for selecting gear stages in the vehicle V having the AMT. Specifically, the next gear stage selection unit 16 according to the illustrative embodiment selects the next gear stage with reference to different fuel consumption contour maps in consideration of the difference in gear transmission efficiency, in both a case where the gear stage of the transmission 2 is a direct gear and a case where the gear stage of the transmission 2 is a normal gear. As a result, the next gear stage selection unit 16 is able to improve the estimation accuracy of the fuel consumption amount in the vehicle V.

Further, when the vehicle V is traveling on an automobile-only road such as a highway, the shift control unit 17 changes whether to shift to the next gear stage selected by the next gear stage selection unit 16 in accordance with various traveling environments where the vehicle V is placed. As a result, it is possible to reduce an uncomfortable feeling which may be given to a driver due to the shift of the vehicle V.

The present disclosure have been described using the illustrative embodiment, but the technical scope of the present disclosure is not limited to the above-described illustrative embodiment and various modifications and changes can be made within the scope of the present disclosure. For example, the specific illustrative embodiment of the dispersion and integration of the device is not limited to the above illustrative embodiment, and all or a part of the illustrative embodiment may be functionally or physically distributed and integrated in optional units. In addition, new illustrative embodiments generated by any combination of a plurality of illustrative embodiments are also contained in the illustrative embodiment of the present disclosure. The effect of the new illustrative embodiment caused by the combination has the effect of the original illustrative embodiment.

The present application is based on a Japanese Patent Application (Japanese Patent Application No. 2017-095966) filed on May 12, 2017, the contents of which are incorporated herein by reference.

INDUSTRIAL APPLICABILITY

The present invention has effects of improving a technique for selecting a shift gear in a vehicle provided with an automated manual transmission, and is useful for a vehicle control device and a vehicle control method.

REFERENCE SIGNS LIST

1: Engine
2: Transmission
3: GPS sensor
4: Weight sensor
5: Speed sensor
6: Accelerator opening sensor
10: Vehicle control device
11: Storage unit
12: Control unit
13: Current gear stage
14: Road slope obtaining unit
15: Travel segment determination unit
16: Next gear selection unit
17: Shift control unit
V: Vehicle

The invention claimed is:

1. A vehicle control device configured to control operation of a vehicle comprising a transmission,
the transmission comprising:
an input shaft configured to receive power of an engine;
a direct gear configured to directly couple the input shaft to an output shaft without using a counter shaft; and
a normal gear configured to transmit the power of the engine to the output shaft via the counter shaft, the normal gear comprising an overdrive gear having a gear ratio lower than that of the direct gear,
the vehicle control device comprising an electronic control unit configured to:
determine a next travel segment ahead of the vehicle in a travel direction, the next travel segment being a travel segment with a road slope different from that of a current travel segment where the vehicle is currently traveling; and
select a next gear stage, which is a gear stage of the transmission in the next travel segment, based on: a travel resistance of the vehicle in the next travel segment estimated based on the road slope of the next travel segment; a speed of the vehicle; and a fuel consumption contour map of the engine provided in the vehicle,
wherein in the selecting of the next gear stage, the electronic control unit is configured to select the next gear stage referring to different fuel consumption contour maps in a case where the gear stage of the transmission is the direct gear and in a case where the gear stage of the transmission is the normal gear.

2. The vehicle control device according to claim 1, wherein the electronic control unit is further configured to:
in response to the vehicle reaching the next travel segment in a case the gear stage of the transmission in the current travel segment is the overdrive gear and the next gear stage is the direct gear and on a condition that an estimated travel time of the vehicle in the next travel segment is longer than predetermined time, control the gear stage of the transmission to downshift to the direct gear.

3. The vehicle control device according to claim 2, wherein in the controlling of the gear stage, the electronic control unit is configured to, in response to the vehicle reaching the next travel segment in a case the gear stage of the transmission in the current travel segment is the overdrive gear and the next gear stage is the direct gear and on a condition that the road slope of the next travel segment is an upslope equal to or greater than a predetermined value, control the gear stage of the transmission to downshift to the direct gear.

4. A vehicle control method for a vehicle comprising an electronic control unit and a transmission,
the transmission comprising an input shaft configured to receive power of an engine, a direct gear configured to directly couple the input shaft to an output shaft without using a counter shaft, and a normal gear configured to transmit the power of the engine to the output shaft via the counter shaft, the normal gear comprising an overdrive gear having a gear ratio lower than that of the direct gear, the vehicle control method comprising controlling the electronic control unit to perform:

determining a next travel segment ahead of the vehicle in a travel direction, the next travel segment being a travel segment with a road slope different from that of a current travel segment where the vehicle is currently traveling; and     selecting a next gear stage, which is the gear stage of the transmission in the next travel segment, based on: a travel resistance of the vehicle in the next travel segment estimated based on the road slope of the next travel segment; a speed of the vehicle; and a fuel consumption contour map of the engine provided in the vehicle, wherein in the selecting of the next gear stage, the next gear stage is selected referring to different fuel consumption contour maps in a case where the gear stage of the transmission is the direct gear and in a case where the gear stage of the transmission is the normal gear.

5. The vehicle control method according to claim 4, comprising controlling the electronic control unit to further perform:

controlling a shift comprising, in response to the vehicle reaching the next travel segment in a case the gear stage of the transmission in the current travel segment is the overdrive gear and the next gear stage is the direct gear and on a condition that an estimated travel time of the vehicle in the next travel segment is longer than a predetermined time, controlling the gear stage of the transmission to downshift to the direct gear.

6. The vehicle control method according to claim 5, wherein the controlling of the shift comprises, in response to the vehicle reaching the next travel segment in a case the gear stage of the transmission in the current travel segment is the overdrive gear and the next gear stage is the direct gear and on a condition that the road slope of the next travel segment is an upslope equal to or greater than a predetermined value, controlling the gear stage of the transmission to downshift to the direct gear.

\* \* \* \* \*